Sept. 2, 1924.
A. C. WICKMAN
SNAP GAUGE
Filed Nov. 23, 1920
1,507,222
2 Sheets-Sheet 1
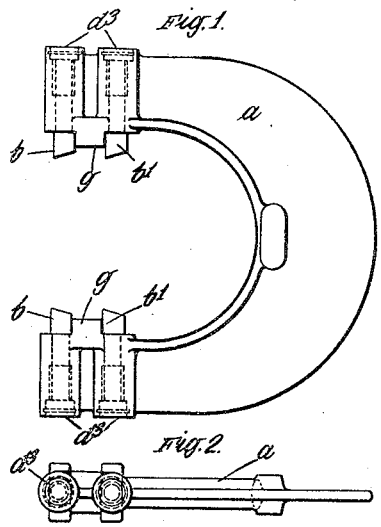
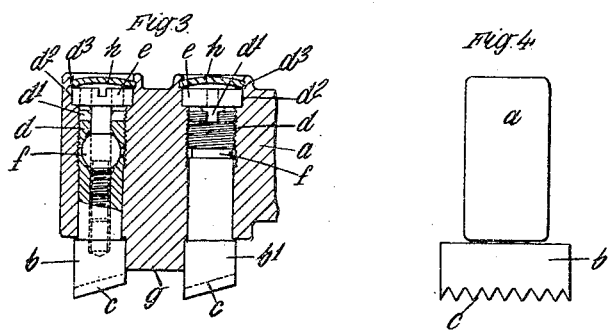
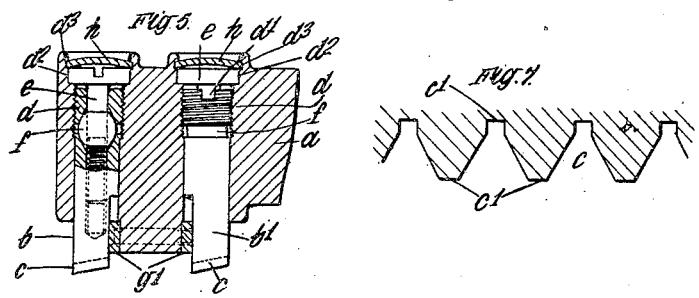

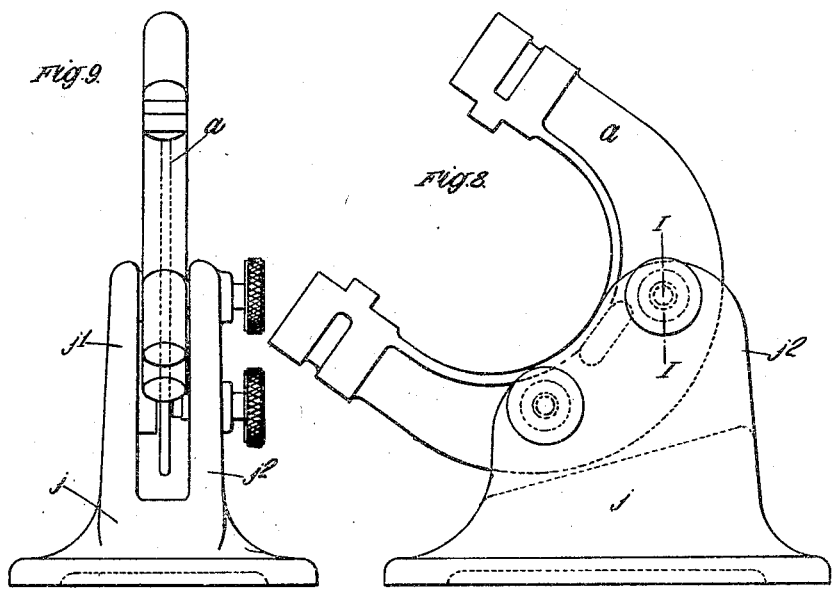
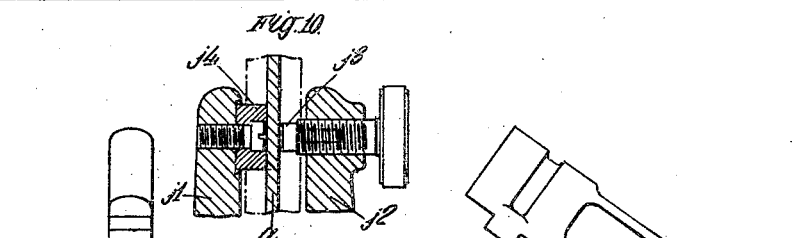
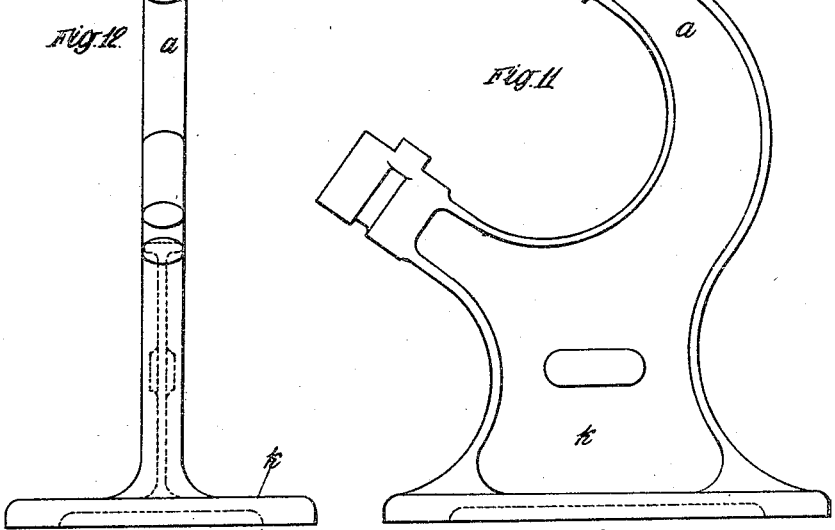

Patented Sept. 2, 1924.

1,507,222

UNITED STATES PATENT OFFICE.

AXEL CHARLES WICKMAN, OF LEAMINGTON SPA, ENGLAND.

SNAP GAUGE.

Application filed November 23, 1920. Serial No. 426,027.

*To all whom it may concern:*

Be it known that I, AXEL CHARLES WICKMAN, a subject of the King of Great Britain, residing at No. 17 Avenue Road, Leamington Spa, in the county of Warwick, England, have invented certain new and useful Improvements in or Relating to Snap Gauges, of which the following is a specification.

The present invention relates to snap gauges and other gauges adapted to be used for testing a very large number of repeated parts so that the gauging parts of the gauge are required to be fixed at a given dimension for a number of tests. The chief objects of the said invention are to enable the setting of adjustable gauging members to be effected more accurately and readily than heretofore, to prevent unauthorized interference with the said setting more conveniently and effectively, and in the case of screw thread snap gauges to provide for the proper and thorough gauging of screw threads. With these and other objects the present invention consists in new or improved means for securing adjustable gauging members in adjusted position, a new device whereby a very fine adjustment may be made according to the force applied to the setting screw, improved devices for sealing in the heads of the setting screws by soft metal sealing discs, a new or improved device for preventing angular movement of adjustable gauging members which prevents any bending of the said members, due to forcing the work, a new formation of the thread form faces of the gauging parts of screw thread snap gauges whereby a clearance for the work is provided and the effect of wear on the gauging parts may be readily remedied, and in the case of screw thread snap gauges having two pairs of gauging parts, an improved formation of the thread form faces of the pair of gauging parts to which the work is secondly presented whereby the work may be properly gauged in its effective dimensions.

In order that the said invention may be clearly understood and readily practised it is hereinafter more particularly described with reference to the accompanying drawings which illustrate by way of example preferred embodiments thereof in connection with screw thread snap gauges although some important features of the said invention are not limited to screw thread gauges.

Figures 1 and 2 of the said drawings are a side view and edge view respectively of the screw thread snap gauge which has two pairs of gauging members, Figure 3 is a sectional view drawn to a larger scale showing the two gauging members in one jaw of the gauge, Figure 4 is an end view of that jaw and Figures 5 and 6 are respectively a view similar to Figure 3 and a view of the inner face of the jaw, showing a modified construction. Figure 7 is a large scale diagrammatic sectional view showing the form of the acting part of the pair of gauging members to which the work is secondly applied. Figures 8 and 9 are side and edge views respectively of a standard for supporting a gauge and showing the gauge in position and Figure 10 is a section on the line 1, 1 Figure 8. Figures 11 and 12 are side and edge views respectively of a gauge with a supporting base or foot.

In the following description the parts of the said figures are referred to by the letters and numerals marked thereon, the same letters and numerals indicating the same or like parts in all the figures.

$a$ is the body of the gauge and $b$, $b$; $b'$, $b'$ are gauging members carried thereby the said members being adjustable to enable not only initial setting to be accurately effected but also to enable adjustment to compensate for wear and to alter the dimension of the gauge at any time as may be desired. The said gauging members are arranged in two pairs, one pair being $b$, $b$ and the other $b'$, $b'$, the two pairs being provided for thorough gauging of work and to enable the gauge to be set and used as a limit gauge. The pair of gauging members $b$, $b$ to which the work is first presented constitutes a "go" gauge while the pair of members $b'$, $b'$ serves as a "no go" gauge to which the work is presented after it has passed between the pair $b$, $b$. All the gauging members are formed at their acting parts with thread form faces $c$, the outer pair of gauge members $b$, $b$ being each formed with a section of a screw thread which has the true form of the thread to be tested, that is to say, the thread is of the correct angle, depth and width and is rounded or otherwise shaped at both top and bottom of the thread to the correct shape and degree, unlike the second or inner pair of members $b'$ $b'$ of which each according to the present invention has a section of screw thread which merely has effective form of the thread to be gauged, that is, the top and bottom of the thread are removed to form an ample clearance at those parts between the thread to be tested and the gauging members $b'$, $b'$ as illustrated at $c'$, $c'$ Figure 7. The cylindrical shank or body of each gauging member is received and has a good sliding fit in a hole in a jaw of the gauge the rear part of which hole is screw threaded and in this screw threaded part there is engaged a distinct screw threaded adjustment member $d$ provided with slots $d'$, $d'$ in its outer end by which it may be turned by means of a suitable tool. $e$ is a screw which is engaged in a screw threaded hole in the rear of each gauging member and passes freely through a central passage in the adjustment member $d$ and has a head constituting an abutment which locates in an enlarged part $d^2$ at the extreme rear end of the hole in the jaw of the gauge. The head of the screw $e$ has a slot to turn it by and as shown in Figure 3 may also have holes through which a suitably formed tool may be passed to engage in the slots $d'$, $d'$ so that the screw $e$ and member $d$ may be turned together. Between the adjustment member $d$ and the rear of the gauging member $b$ or $b'$ is a steel spherical member $f$ engaged in and between conical recesses in the end of the adjustment member $d$ and rear end of the gauging member adjacent thereto respectively; therefore when the screw $e$ is tightened up its head bears upon the shoulder-like bottom of the recess $d^2$ being a part of the body of the gauge and causes the gauging member to bear tightly against the adjustment member $d$ through the medium of the spherical member $f$. Any backlash in the adjustment member $d$ is therefore effectually taken up and the gauging member very firmly and positively held. The position of the adjustment member $d$ determines the position of the gauging member and by rotating the former by a suitable tool, its longitudinal position in the rear of the hole in which it is located may be adjusted as required. As the screw $e$ has no bearing on the member $d$, there is no tendency for the rotation of the screw $e$ to turn the said member and so alter the adjustment of the latter. It is of course essential that the axes of the gauging members of each pair be accurately in line and to ensure this with the construction described the opposite holes in the jaws must be tapped exactly true in relation to their axes but on the other hand it is difficult to ensure that a tap shall enter and form a screw thread in a hole exactly parallel or concentric to the axis of the hole but the spherical members $f$ neutralize any inaccuracy which may exist in this respect as the members $f$ being spherical and engaged in conical recesses in the members $d$ and gauging members always have a circular bearing against the walls of the recess although the axes of the screw thread in the hole in the gauging member and the screw thread in the hole in the jaw of the gauge may not be quite coincident with each other or with the axes of the holes in which the screw threads are provided. Furthermore the said members $f$ perform another important function in as much as their provision imparts slight resilience to the junction this resilience being just sufficient to enable the dimension of the gauge to be varied to a very fine extent according to the turning force applied to the screw $e$ which is very advantageous for the delicate and accurate setting of the gauge. The said screw $e$ passes through a hole in the spherical member $f$ with clearance and the conical recesses in the member $d$ and gauging member are preferably coned at an angle of about 30° to their axes, making 60° between the sides of the recesses in axial section. As shown in Figures 3 and 4 the gauging members for a screw thread gauge are preferably T-shaped that is the acting parts in a direction transverse to the movement of presentation of the work are considerably wider than the diameter of their stems and the gauging members are restrained from angular movement and caused to assume correct angular position relatively to their axes on assembly, by the flat parts of the heads fitting against the flat sides of a projection $g$ on the inner side of the gauge jaw and between the two gauge members therein. This form of gauging member however makes it necessary that on assembly the members be placed in position from within the jaws. In cases where the dimensions is too small for this the heads or acting parts of the gauging members must not be larger than will pass through the holes in the jaws from the outer sides thereof and in that case the gauging members are retained in angular position by flats on them taking against flats on separately made fillets $g'$, $g'$ secured in position after the holes are formed and overhanging the inner ends of the holes as necessary as shown in Figures 5 and 6. By preventing angular movement of the gauging members by providing flat abutment surfaces near their acting ends—that is, immediately adjacent to the protrusion of the gauging members from the jaws—a strong and effective abutment means is also provided for the first pair of members which prevents any bending of the stems thereof should they be forced as usually occurs with the first pair of jaws.

After the gauging members have been secured in adjusted position the means by which they are so secured and adjusted are sealed with lead or like seals in order that the said means cannot be tampered with without the act being apparent. For this purpose the recesses $d^2$ are made deeper than necessary merely to receive the heads of the screws $e$ and are provided with annular recesses $d^3$ in the sides just outside the heads. Round dished or concavo-convex lead or like sealing members or blanks $h$ are then put in the recesses $d^2$ and pressure being applied to the blanks $h$ they are somewhat flattened and their edge parts are forced into the recesses $d^3$ as shown thus forming seals over the heads of the screws $e$. In order to avoid improper strain on the gauge in this pressing operation the two seals $h$, $h$ in each jaw are pressed at the same time by any suitable apparatus while the jaw is held up by the part $g$ resting on an abutment; furthermore preferably the pressure is such and the seals are so formed that when they are in engaged position they do not bear on the screws $e$. The soft metal seals $h$, $h$ although locked in position without possibility of removal without destruction are yet made or completed from preformed blanks in distinction to wax and other seals formed in place by melting or fusion.

In setting the gauge the two gauging members $b$, $b$ are adjusted or set up to a gauge of any kind having a diameter equal to the true diameter of the thread at the roots, allowing for any limit as desired. As before stated and illustrated "no go" pair of gauging members $b'$, $b'$ have only the effective form of the thread to be gauged. This is for the reason that the exact form of the thread at its top and bottom is not important; it is more important to gauge the pitch and the mean width of the thread. The amount cut from the top of the thread section of these gauging members, that is, the distance between the resulting flat top and the top of the true form of thread is preferably engraved upon the gauging members. Then in setting the "no go" members $b'$, $b'$ they are adjusted by means of a cylindrical or other gauge until the flat tops of the thread of the thread sections of the two members are at a distance apart equal to the diameter of the true thread at the root with an amount added equal to twice the amount engraved on the gauging members as aforesaid. If the thread to be tested be incorrect in some respects it will not pass between the gauging members $b$, $b$ and will therefore be rejected and if on the other hand the inaccuracy be such, as for instance too small a width in the thread, which will enable the thread to be tested to pass between the gauging members $b$, $b$ it will also pass between the "no go" gauging members $b'$, $b'$ and will similarly be rejected. A thread passing by the "go" members $b$, $b$ but not passing by the "no go" members $b'$, $b'$ may be passed as correct. If in practice a definite limit is allowed for allowable variation in the mean width of the thread the "no go" gauging members $b'$, $b'$ must be set slightly closer together than as referred to above by an amount sufficient to allow for this. In certain cases, a screw thread having a mean width rather less than the limit might not pass the "no go" gauging members if they had sections of thread of true form and consequently the thread might be passed although inaccurate in an important respect, as for instance if the thread to be tested had an abnormal thickening at the top of the thread or an insufficiently formed bottom, but by having the bottom of the thread formed with a gap and the top removed as at $e'$ on these gauging members this possible passing of a thread inaccurate in its mean width or pitch is avoided and the test a very accurate one.

By examining the drawings it will be observed that the opposed faces of the gauging members are bevelled or inclined so producing a testing edge-like portion to each of the faces. This bevel or inclination affords a clearance which the present inventor has devised, and which is necessary for the proper gauging of screw threads in consequence of the helical angle of the thread. This clearance is in itself novel and an important feature of the present invention. The angle of inclination or clearance is preferably 10° to the plane in which the work is passed between the gauging members, but this particular angle or one approximating to it is not essential as the angle may be varied considerably provided sufficient clearance is afforded and on the other hand sufficient strength retained at the testing edge-like portion of the gauging member and the part immediately adjacent thereto. The bevel or inclination is preferably in the direction shown in the drawings, that is such that the testing edge-like portions of the gauging members are at the parts thereof first approached by the work, but the bevel or inclination may be such that the testing edge-like portions are at the opposite part of the gauging member and the bevel or inclination thus in the reverse direction to that shown.

A further advantage of the clearance feature referred to is that if the thread form on the gauging members be made accurately without variation from the testing edge-like portion of the gauging member to the opposite edge or part the effect of wear on the testing edge may be removed by simply regrinding the plain face of the gauging member adjacent to the testing edge, and resetting the gauging member.

In order to facilitate use of a gauge where a great number of successive tests have to be made, a standard to be secured on a bench or the like may be provided having means whereby the gauge may be secured in it for the time being and removed therefrom when to be used in the hand. This is illustrated in Figures 8, 9 and 10 in which $j$ is the standard having jaws $j'$, $j^2$ between which the web of the snap gauge may be engaged. The jaw $j^2$ carries two clamping screws $j^5$, $j^5$ carrying at their extremities soft iron noses in the form of screws $j^3$ and the jaw $j'$ carries two seats $j^4$ of vulcanized fibre or similarly comparatively soft material. The web of the snap gauge may therefore be gripped as shown between the screw noses $j^3$ and the seats $j^4$ to hold the gauge in a convenient position for use as shown. On the other hand by relaxing the screws $j^5$, $j^5$ the gauge may be released. Or as illustrated in Figures 11 and 12 the body of the gauge may be provided with a foot $k$ by which it may be secured on a bench or the like in cases where it is not intended that the gauge be used in the hand.

What I claim and desire to secure by Letters Patent of the United States is:—

1. A gauge comprising a body, an adjustable gauging member comprising a shank part engaged in said body, a screw threaded adjustable member having a passage through it and threaded in said body substantially in line with said shank part, and a setting screw having an abutment on it and passed through the passage in said screw threaded adjustable member and engaged in the said shank part, the said abutment co-acting with said body so that the said body takes the setting pressure from the said abutment independently of the said screw threaded adjustable member.

2. A gauge comprising a body, an adjustable gauging member a part of which is engaged in a hole in the said body, a screw threaded adjustable member having a passage through it and threaded in the said hole substantially in line with the said gauging member, and a setting screw provided with an abutment and passed through the passage in said screw threaded adjustable member and engaged in the said gauging member, the said abutment co-acting with the said body so that the said body takes the setting pressure from the said abutment independently of the said screw threaded adjustable member.

3. A gauge comprising a body, an adjustable gauging member comprising a shank part engaged in said body, a screw threaded adjustable member having a passage through it and threaded in said body substantially in line with said shank part, a setting screw passed through the passage in said screw threaded adjustable member and engaged in the said shank part, the opposed parts of the said shank part and the said screw threaded adjustable member being recessed, and a spherical member disposed in such recesses and having a passage in it through which the said screw passes.

4. A gauge comprising a body, an adjustable gauging member carried by the said body, screw means for setting and securing the gauging member in adjusted position, an abutment to take the pressure of the setting means and a member interposed between the gauging member and the said abutment to render the junction between them variably responsive according to the setting pressure, for fine adjustment of the gauging member.

5. A gauge comprising a body, an adjustable gauging member part of which is engaged with said body, a setting screw to secure said member in adjusted position and having a head part, said body having a recess in which said head part is accommodated, said recess having in its wall an annular or circular endless recess, and a blank originated soft metal seal over the head part of said screw, the edge part of which seal is locked in said annular recess by mechanically made engagement.

6. A gauge comprising a body, an adjustable gauging member having a cylindrical portion engaged in a hole in the said body, the said member and the said body having flat co-acting abutment faces to prevent angular movement of the said gauging member around the axis of its cylindrical part in the body, the said abutment faces being located at and near that end of the said hole in the body nearer to the gauging part of the gauging member.

7. A gauge comprising a body, an adjustable gauging member having a cylindrical portion engaged in a hole in the said body, the said member and the said body having flat co-acting abutment faces to prevent angular movement of the said gauging member around the axis of its cylindrical part in the body, the said abutment faces being at that side of the gauging member which is opposite to the side to which the work is brought up to the gauge and at and near that end of the said hole in the body nearer to the gauging part of the gauging member to prevent bending of the gauging member.

8. A gauge comprising a body, an adjustable gauging member having a part engaged in a hole in the said body, the said hole being screw threaded at a part not occupied by the portion of the gauging member, an adjustable screw threaded member engaged with the screw threaded portion of the said hole, the opposed ends of the said gauging member and adjustable screw threaded member having conical recesses and the said screw threaded member having a passage through it, a spherical member having a passage through it and located between the said conical parts and a headed screw engaged with the gauging member and passing with clearance through the passages in the adjustable screw threaded member and the spherical member, and the head of the screw bearing against the body of the gauge.

9. A screw thread snap gauge comprising a pair of gauging parts opposite to each other, the opposed faces of the said parts between which the work is passed, being of bevelled or inclined form to provide a testing edge-like portion to each of said faces, the said testing edge-like portion having an outline corresponding to the sectional contour of a portion of screw thread.

10. A screw thread snap gauge comprising a pair of gauging parts opposite to each other, the opposed faces of the said parts between which the work is passed, being of bevelled or inclined form to produce a testing edge-like portion to each of said faces at the parts thereof which are first approached by the work in presenting it to the gauge, the said testing edge-like portion having an outline corresponding to the sectional contour of a portion of screw thread.

11. A screw thread snap gauge comprising a pair of gauging parts opposite to each other, the opposed faces of the said parts between which the work is passed being of bevelled or inclined form to produce a testing edge-like portion to each of said faces and the angle of such bevel or inclination being about 10 degrees to a plane at right angles to the plane containing the testing edges of both gauging parts.

12. A screw thread snap gauge comprising a pair of gauging parts opposite to each other the opposed faces of the said parts between which the work is passed being of bevelled or inclined form to produce a testing edge-like portion to each of said faces at the part thereof which is first approached by the work in presenting it to the gauge and the angle of the bevel or inclination being about 10 degrees to a plane at right angles to the plane containing the testing edge-like parts of both gauging parts.

13. A screw thread snap gauge comprising a body and a plurality of pairs of gauging parts on the said body, one pair of said gauging parts having thread form acting parts which correspond to the complete true sectional form which the screw thread to be tested should have and another pair of the gauging parts having thread form acting parts which correspond to the said sectional form except that there are clearances at the tops and bottoms of the threads represented to cause the thread form to represent the effective dimensions only of the screw thread in cross section.

14. A screw thread snap gauge comprising a body and an adjustable gauging member carried by said body the said gauging member having a thread form face bevelled or inclined to the plane containing the axis of the thread as the work is passed into the gauge, to constitute a testing edge-like portion to said face, the thread forms of the said face being at right angles to said testing edge.

15. A gauging member having a shank for adjustment in the body of a screw thread snap gauge, said member having a face bevelled or inclined relatively to the axis of the shank to constitute a testing edge-like portion of the face, the said testing edge-like portion having an outline corresponding to the sectional contour of a portion of screw thread.

16. A gauging member having a shank for adjustment in the body of a screw thread snap gauge, said member having a face bevelled or inclined relatively to the axis of the shank to constitute a testing edge-like portion at that end of the bevel or incline which when the said member is in place is first approached by the work in presenting it to the gauge, the said testing edge-like portion having an outline corresponding to the sectional contour of a portion of screw thread.

17. A gauging member having a shank for adjustment in the body of a screw thread snap gauge the said member having a face bevelled or inclined relatively to a plane at right angles to the axis of the said shank to constitute a testing edge-like portion, the bevel or incline being at an angle of about 10 degrees to the said plane, and the said testing edge-like portion having an outline corresponding to the sectional contour of a portion of screw thread.

18. A gauging member for adjustment in the body of a screw thread snap gauge, having a thread form testing edge-like portion which in outline represents portions of the cross sectional form of the screw thread to be tested between the tops and bottoms of the thread, clearances being provided in the said testing edge-like portion for the said tops and bottoms.

19. A gauging member for adjustment in the body of a screw thread snap gauge, the said member having a thread form face bevelled or inclined relative to the axis of the shank to constitute a testing edge-like portion of said face the thread forms of the said face being at right angles to said testing edge-like portion.

AXEL CHARLES WICKMAN.